Aug. 12, 1941.     H. A. KNOX     2,251,944
BEARING
Filed Feb. 7, 1941
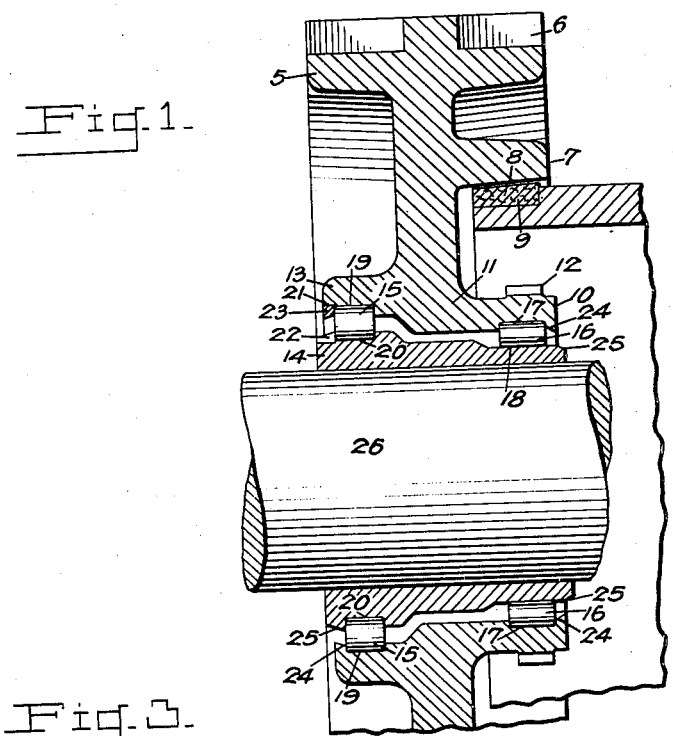
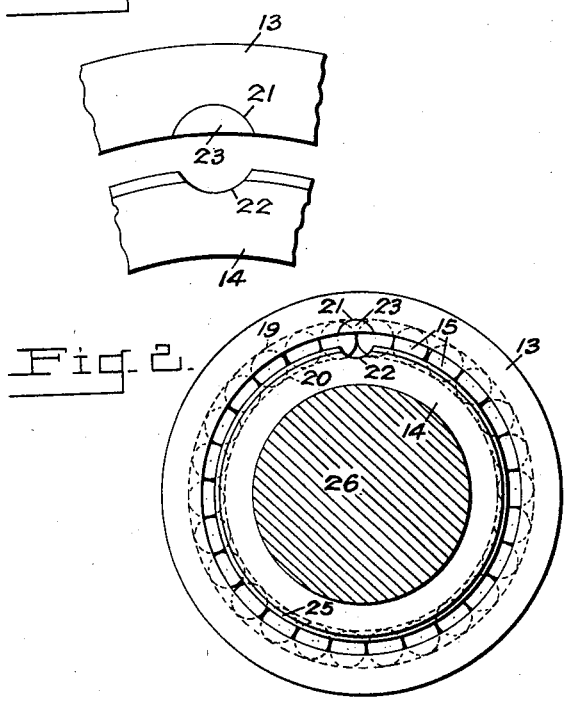
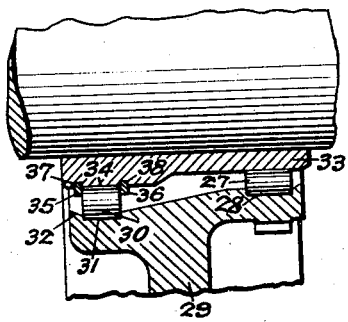
INVENTOR
Harry A. Knox
BY
ATTORNEYS Patented Aug. 12, 1941

2,251,944

UNITED STATES PATENT OFFICE 2,251,944

BEARING

Harry A. Knox, Washington, D. C.

Application February 7, 1941, Serial No. 377,795

3 Claims. (Cl. 308—210)

(Granted under the act of March 3, 1883, as amended April 30, 1928; 370 O. G. 757)

The invention described herein may be manufactured and used by or for the Government for governmental purposes, without the payment to me of any royalty thereon.

The subject of this invention is a bearing.

In mounting a gear element of a synchronizing clutch as shown in my patent, 2,229,094 of January 21, 1941, the sets of bearings are arranged with the larger one on the side opposite to the friction clutch member for the purpose of taking the thrust while the smaller one is placed in line with the teeth which are to be engaged by the positive clutch member. However, because of the additional thrust incident to the employment of helical gear teeth on the main gear element the particular bearings shown in the patent have been unsatisfactory.

The purpose of this invention is to provide a bearing caged by a gear wheel which will function satisfactorily under the severe conditions imposed by heavy track-laying vehicles.

The specific nature of the invention as well as other objects and advantages thereof will clearly appear from a description of a preferred embodiment as shown in the accompanying drawing in which:

Fig. 1 is a sectional view of the improved bearing.

Fig. 2 is a view in side elevation.

Fig. 3 is an enlarged view in side elevation of a portion of the bearing.

Fig. 4 is a sectional view of a modification.

Referring to the drawing by characters of reference there is shown a portion of a synchronizing clutch having a gear wheel 5 with helical teeth 6. The wheel is formed with a flange 7 having an inner conical face 8 for engagement by the friction clutch member 9 of the synchronizing clutch while the corresponding flange 10 of the hub 11 is provided externally with teeth 12 for engagement by a positive clutch member (not shown).

The hub includes a flange 13 disposed oppositely to the flange 10 and is rotatably mounted on a sleeve 14 by means of a set of large rollers 15 and a set of small rollers 16. The two sets of rollers are disposed at varying distances from the axis of the gear wheel, the set of large rollers being at a greater distance from the axis of the gear wheel.

The flange 10 is formed internally with an annular groove or race 17 for receiving and laterally confining the small rollers 16 and when the gear wheel is assembled onto the sleeve with the rollers 16 in place they engage the surface 18 of the sleeve.

The flange 13 is formed internally with an annular groove 19 and the sleeve is formed externally with an oppositely disposed groove 20 for receiving and laterally confining the large rollers 15. These rollers are placed in the groove after assembly of the gear wheel and sleeve and they are individually inserted through an aperture constituted by arcuate recesses or slots 21 and 22 respectively provided in the wheel and the sleeve. After inserting all of the rollers the outer slot 21 in the gear wheel is closed by means of a plug 23 of solder to prevent escape of oil under the action of centrifugal force.

The opposite marginal portions of the gear wheel and sleeve are inclined towards the axis of these members as shown respectively at 24—24 and 25—25 so that oil which has collected on the shaft 26 will, under the influence of centrifugal force, be directed to the rollers.

In the modification shown in Fig. 4 the small rollers 27 are similarly caged in a groove 28 of the gear wheel 29. The large rollers 30 are also caged in a groove 31 of the gear wheel but in this example the outer marginal portion 32 defining the groove is unbroken by a loading slot. The sleeve 33 has a groove 34 for the large rollers formed by spaced rings 35—35 seated respectively in grooves 37—38.

Assembly is accomplished by moving the sleeve to the right over the small rollers until it clears the groove 31, then inserting the large rollers in the groove 31, restoring the sleeve to its final position, and then inserting the outer ring 35.

I claim:

1. In a bearing, an outer member having spaced annular grooves at different distances from its axis, a set of large rollers and a set of small rollers caged in the grooves, the large rollers being in the grooves at the greater distance from the axis, an inner member engaging the rollers and including a groove for the large rollers, the marginal portions defining the grooves for the large rollers having arcuate slots for insertion of the rollers into the grooves, a plug inserted in the arcuate slot of the outer member after insertion of the rollers, and the opposed marginal portions of both inner and outer members having faces inclined towards the axis of said members.

2. In a bearing, an outer member having spaced annular grooves, sets of rollers caged in the grooves, an inner member engaging the rollers, and the opposed marginal portions of both inner and outer members having faces inclined towards the axis of said members.

3. In a bearing, an outer member having spaced annular grooves at different distances from its axis, a set of large rollers and a set of small rollers caged in the grooves, the large rollers being in the grooves at the greater distance from the axis of said members, and an inner member engaging the rollers and having a groove for the large rollers.

HARRY A. KNOX.